(12) United States Patent
Wagholikar et al.

(10) Patent No.: US 8,750,278 B1
(45) Date of Patent: Jun. 10, 2014

(54) METHOD AND APPARATUS FOR OFF-CHANNEL DEVICE INVITATION

(75) Inventors: Sarang Shrikrishna Wagholikar, Sunnyvale, CA (US); Deepak Shanhaji Nagawade, Aundh (IN)

(73) Assignee: Marvell International Ltd., Hamilton (BM)

( * ) Notice: Subject to any disclaimer, the term of this patent is extended or adjusted under 35 U.S.C. 154(b) by 46 days.

(21) Appl. No.: 13/479,124

(22) Filed: May 23, 2012

Related U.S. Application Data

(60) Provisional application No. 61/490,452, filed on May 26, 2011.

(51) Int. Cl.
| | |
|---|---|
| H04J 1/00 | (2006.01) |
| H04L 12/28 | (2006.01) |
| H04L 12/43 | (2006.01) |
| H04L 12/66 | (2006.01) |
| H04J 3/00 | (2006.01) |

(52) U.S. Cl.
USPC .......... 370/343; 370/351; 370/459; 370/463; 370/464; 370/480

(58) Field of Classification Search
USPC ......... 370/229, 235, 236, 310, 342, 343, 345, 370/351, 431, 433, 437, 441, 442, 443, 445, 370/447, 448, 458, 459, 461, 462, 463
See application file for complete search history.

(56) References Cited

U.S. PATENT DOCUMENTS

| | | | |
|---|---|---|---|
| 4,337,463 A | 6/1982 | Vangen | |
| 5,673,291 A | 9/1997 | Dent | |
| 6,320,919 B1 | 11/2001 | Khayrallah et al. | |
| 6,816,452 B1 | 11/2004 | Maehata | |
| 7,239,882 B1 | 7/2007 | Cook | |
| 7,342,895 B2 | 3/2008 | Serpa et al. | |
| 7,551,948 B2 | 6/2009 | Meier et al. | |
| 7,564,826 B2 | 7/2009 | Sherman et al. | |
| 7,595,768 B2 | 9/2009 | Li et al. | |
| 7,599,671 B2 | 10/2009 | Kopikare et al. | |

(Continued)

FOREIGN PATENT DOCUMENTS

| | | |
|---|---|---|
| EP | 1860827 | 11/2007 |
| JP | 2006174162 | 6/2006 |

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol Specification (Release 10)", 3GPP TS 36.331; V10.5.0; 3GPP Organizational Partners, 2012, 302 pages.

(Continued)

*Primary Examiner* — Omar Ghowrwal

(57) ABSTRACT

The present disclosure describes techniques for off-channel device invitation. In some aspects a first frame is transmitted on a first channel of a wireless medium effective to prevent a member device of a peer-to-peer group from attempting to access the wireless medium, a second frame inviting a wireless device to join the peer-to-peer group is transmitted on a second channel of the wireless medium, and the first channel of the wireless medium is returned to thereby enabling a next attempt of the member device to access the wireless medium.

20 Claims, 6 Drawing Sheets

(56) References Cited

U.S. PATENT DOCUMENTS

| | | |
|---|---|---|
| 7,626,966 B1 | 12/2009 | Ruiter et al. |
| 7,711,004 B2 | 5/2010 | Xu |
| 7,957,340 B2 | 6/2011 | Choi et al. |
| 7,966,036 B2 | 6/2011 | Kojima |
| 8,014,329 B2 | 9/2011 | Gong |
| 8,072,913 B2 | 12/2011 | Desai |
| 8,078,111 B2 | 12/2011 | Jovicic et al. |
| 8,149,715 B1 | 4/2012 | Goel |
| 8,170,002 B2 | 5/2012 | Wentink |
| 8,170,546 B2 | 5/2012 | Bennett |
| 8,189,506 B2 | 5/2012 | Kneckt et al. |
| 8,229,087 B2 | 7/2012 | Sumioka et al. |
| 8,254,296 B1 | 8/2012 | Lambert et al. |
| 8,274,894 B2 | 9/2012 | Kneckt et al. |
| 8,310,967 B1 | 11/2012 | Goel |
| 8,340,034 B1 | 12/2012 | Lee et al. |
| 8,472,427 B1 | 6/2013 | Wheeler et al. |
| 8,553,561 B1 | 10/2013 | Chokshi et al. |
| 2002/0025810 A1 | 2/2002 | Takayama et al. |
| 2002/0049854 A1 | 4/2002 | Cox et al. |
| 2003/0040316 A1 | 2/2003 | Stanforth et al. |
| 2004/0105401 A1 | 6/2004 | Lee |
| 2004/0192222 A1 | 9/2004 | Vaisanen et al. |
| 2004/0233881 A1 | 11/2004 | Kang et al. |
| 2004/0264396 A1 | 12/2004 | Ginzburg et al. |
| 2004/0264397 A1 | 12/2004 | Benveniste |
| 2005/0018641 A1 | 1/2005 | Zhao et al. |
| 2005/0025104 A1 | 2/2005 | Fischer et al. |
| 2005/0025174 A1 | 2/2005 | Fischer et al. |
| 2005/0135360 A1 | 6/2005 | Shin et al. |
| 2005/0174962 A1 | 8/2005 | Gurevich |
| 2005/0186962 A1 | 8/2005 | Yoneyama et al. |
| 2005/0206554 A1 | 9/2005 | Yamaura |
| 2005/0250528 A1 | 11/2005 | Song et al. |
| 2005/0254423 A1 | 11/2005 | Berghoff |
| 2005/0281278 A1 | 12/2005 | Black et al. |
| 2006/0007863 A1 | 1/2006 | Naghian |
| 2006/0079232 A1 | 4/2006 | Omori et al. |
| 2006/0120338 A1 | 6/2006 | Hwang et al. |
| 2006/0199565 A1 | 9/2006 | Ammirata |
| 2006/0200862 A1 | 9/2006 | Olson et al. |
| 2006/0215601 A1 | 9/2006 | Vleugels et al. |
| 2006/0251198 A1 | 11/2006 | Ma et al. |
| 2006/0252418 A1 | 11/2006 | Quinn et al. |
| 2006/0264179 A1 | 11/2006 | Bonneville et al. |
| 2006/0268756 A1 | 11/2006 | Wang et al. |
| 2006/0268804 A1 | 11/2006 | Kim et al. |
| 2006/0282541 A1 | 12/2006 | Hiroki |
| 2006/0282667 A1 | 12/2006 | Kim et al. |
| 2006/0286935 A1 | 12/2006 | Utsunomiya et al. |
| 2007/0010237 A1 | 1/2007 | Jones et al. |
| 2007/0010247 A1 | 1/2007 | Mouna-Kingue et al. |
| 2007/0014314 A1 | 1/2007 | O'Neil |
| 2007/0109973 A1 | 5/2007 | Trachewsky |
| 2007/0178888 A1 | 8/2007 | Alfano et al. |
| 2007/0183443 A1 | 8/2007 | Won |
| 2007/0206519 A1 | 9/2007 | Hansen et al. |
| 2007/0206762 A1 | 9/2007 | Chandra et al. |
| 2007/0223430 A1 | 9/2007 | Desai et al. |
| 2007/0238482 A1 | 10/2007 | Rayzman et al. |
| 2007/0242645 A1 | 10/2007 | Stephenson et al. |
| 2007/0268862 A1* | 11/2007 | Singh et al. .................. 370/329 |
| 2007/0286298 A1 | 12/2007 | Choi et al. |
| 2007/0297388 A1 | 12/2007 | Appaji et al. |
| 2008/0056201 A1 | 3/2008 | Bennett |
| 2008/0069034 A1 | 3/2008 | Buddhikot et al. |
| 2008/0080446 A1 | 4/2008 | Chung |
| 2008/0095058 A1 | 4/2008 | Dalmases et al. |
| 2008/0095059 A1 | 4/2008 | Chu |
| 2008/0130595 A1 | 6/2008 | Abdel-Kader |
| 2008/0137580 A1 | 6/2008 | Axelsson et al. |
| 2008/0139212 A1 | 6/2008 | Chen et al. |
| 2008/0161031 A1 | 7/2008 | Tu |
| 2008/0170550 A1 | 7/2008 | Liu et al. |
| 2008/0181154 A1 | 7/2008 | Sherman |
| 2008/0187003 A1 | 8/2008 | Becker |
| 2008/0232287 A1 | 9/2008 | Shao et al. |
| 2008/0259846 A1 | 10/2008 | Gonikberg et al. |
| 2008/0261640 A1 | 10/2008 | Yoshida |
| 2008/0262991 A1 | 10/2008 | Kapoor et al. |
| 2008/0279163 A1 | 11/2008 | Desai |
| 2008/0320108 A1 | 12/2008 | Murty et al. |
| 2009/0010210 A1 | 1/2009 | Hiertz et al. |
| 2009/0137206 A1 | 5/2009 | Sherman et al. |
| 2009/0175250 A1 | 7/2009 | Mathur et al. |
| 2009/0196210 A1 | 8/2009 | Desai |
| 2009/0239471 A1 | 9/2009 | Tran et al. |
| 2009/0245133 A1 | 10/2009 | Gupta et al. |
| 2009/0245279 A1 | 10/2009 | Wan et al. |
| 2009/0247217 A1 | 10/2009 | Hsu et al. |
| 2009/0268652 A1 | 10/2009 | Kneckt et al. |
| 2009/0285264 A1 | 11/2009 | Aldana et al. |
| 2010/0011231 A1 | 1/2010 | Banerjea et al. |
| 2010/0029325 A1 | 2/2010 | Wang et al. |
| 2010/0061244 A1 | 3/2010 | Meier et al. |
| 2010/0069112 A1 | 3/2010 | Sun et al. |
| 2010/0130129 A1 | 5/2010 | Chang et al. |
| 2010/0138549 A1 | 6/2010 | Goel et al. |
| 2010/0165896 A1 | 7/2010 | Gong et al. |
| 2010/0238793 A1 | 9/2010 | Alfano et al. |
| 2010/0316027 A1 | 12/2010 | Rick et al. |
| 2010/0322213 A1 | 12/2010 | Liu et al. |
| 2011/0002226 A1 | 1/2011 | Bhatti |
| 2011/0007675 A1 | 1/2011 | Chiou et al. |
| 2011/0009074 A1 | 1/2011 | Hsu et al. |
| 2011/0097998 A1 | 4/2011 | Ko et al. |
| 2011/0103363 A1 | 5/2011 | Bennett |
| 2011/0161697 A1* | 6/2011 | Qi et al. ........................ 713/320 |
| 2011/0194519 A1 | 8/2011 | Habetha |
| 2012/0099476 A1 | 4/2012 | Mahaffy et al. |
| 2012/0276938 A1 | 11/2012 | Wagholikar et al. |
| 2013/0176903 A1 | 7/2013 | Bijwe |

FOREIGN PATENT DOCUMENTS

| | | |
|---|---|---|
| WO | WO-2006043956 | 4/2006 |
| WO | WO-2006090254 | 8/2006 |
| WO | WO-2007008981 | 1/2007 |
| WO | WO-2007064822 | 6/2007 |
| WO | WO-2008070777 | 6/2008 |
| WO | WO-2009101567 | 8/2009 |
| WO | WO-2011056878 | 5/2011 |
| WO | WO-2013104989 | 7/2013 |
| WO | WO-2013119810 | 8/2013 |

OTHER PUBLICATIONS

"Advisory Action", U.S. Appl. No. 12/646,721, Aug. 13, 2013, 3 pages.

"Draft Standard for Information Technology—Telecommunications and information exchange between systems—Local and metropolitan area networks—Specific requirements", IEEE P802.11s/D1.03, Apr. 2007, 251 pages.

"Final Office Action", U.S. Appl. No. 12/646,802, Nov. 15, 2012, 15 pages.

"Final Office Action", U.S. Appl. No. 12/646,721, Jun. 6, 2013, 16 pages.

"Final Office Action", U.S. Appl. No. 12/484,563, Apr. 24, 2012, 18 pages.

"Final Office Action", U.S. Appl. No. 12/616,454, Apr. 11, 2012, 19 pages.

"Final Office Action", U.S. Appl. No. 12/186,429, Oct. 13, 2011, 23 pages.

"Final Office Action", U.S. Appl. No. 12/542,845, Sep. 25, 2012, 23 pages.

"Further Higher Data Rate Extension in the 2.4 GHz Band", IEEE P802.11g/D8.2,Draft Supplement to Standard [for] Information Technology, Apr. 2003, 69 pages.

Haas, et al.,"Gossip-Based Ad Hoc Routing", IEEE/ACM Transactions on Networking, vol. 14, No. 3, Jun. 2006, pp. 479-491.

"IEEE Standard for Information Technology—Telecommunications and information exchange between systems—Local and metropoli-

(56) References Cited

OTHER PUBLICATIONS tan area networks—Specific requirements Part 11: Wireless LAN Medium Access Control (MAC) and Physical Layer (PHY) specifications Amendment", IEEE Computer Society, Oct. 14, 2010, pp. 12-18, 23, 65-68.
"International Search Report and Written Opinion", PCT Application PCT/US2012/035597, Aug. 6, 2012, 13 pages.
"Non-Final Office Action", U.S. Appl. No. 12/167,841, Jul. 15, 2011, 10 pages.
"Non-Final Office Action", U.S. Appl. No. 13/099,169, Mar. 28, 2013, 12 pages.
"Non-Final Office Action", U.S. Appl. No. 13/673,363, Nov. 29, 2013, 12 pages.
"Non-Final Office Action", U.S. Appl. No. 13/429,090, Oct. 24, 2013, 13 pages.
"Non-Final Office Action", U.S. Appl. No. 12/484,563, Oct. 4, 2011, 13 pages.
"Non-Final Office Action", U.S. Appl. No. 12/732,036, Aug. 9, 2012, 13 pages.
"Non-Final Office Action", U.S. Appl. No. 12/646,721, Nov. 7, 2012, 15 pages.
"Non-Final Office Action", U.S. Appl. No. 12/646,721, May 10, 2012, 15 pages.
"Non-Final Office Action", U.S. Appl. No. 12/646,802, Mar. 29, 2012, 16 pages.
"Non-Final Office Action", U.S. Appl. No. 12/186,429, Apr. 25, 2011, 19 pages.
"Non-Final Office Action", U.S. Appl. No. 12/542,845, Apr. 4, 2012, 19 pages.
"Non-Final Office Action", U.S. Appl. No. 12/542,845, Oct. 23, 2013, 29 pages.
"Non-Final Office Action", U.S. Appl. No. 12/616,454, Dec. 22, 2011, 8 pages.
"Non-Final Office Action", U.S. Appl. No. 13/249,740, Mar. 26, 2013, 9 pages.
"Non-Final Office Action", U.S. Appl. No. 13/249,740, Oct. 16, 2013, 9 pages.
"Non-Final Office Action", U.S. Appl. No. 13/099,169, Oct. 4, 2013, 9 pages.
"Notice of Allowance", U.S. Appl. No. 12/167,841, Nov. 25, 2011, 11 pages.
"Notice of Allowance", U.S. Appl. No. 12/616,454, Aug. 22, 2012, 4 pages.
"Notice of Allowance", U.S. Appl. No. 12/484,563, Jul. 9, 2012, 6 pages.
"Notice of Allowance", U.S. Appl. No. 12/716,569, Apr. 19, 2012, 7 pages.
"Notice of Allowance", U.S. Appl. No. 12/732,036, Feb. 21, 2013, 8 pages.
"Notice of Allowance", U.S. Appl. No. 12/186,429, Jun. 6, 2013, 9 pages.
"Part 11: Wireless LAN Medium Access Control (MAC) and Physical Layer (PHY) specifications", IEEE Std 802.11b-1999/Cor 1-2001, Amendment 2: Higher-speed Physical Layer (PHY) extension in the 2.4 GHz band, Nov. 7, 2001, 23 pages.
"Part 11: Wireless LAN Medium Access Control (MAC) and Physical Layer (PHY) specifications", IEEE Std 802.11a-1999, High-speed Physical Layer in the 5 GHz Band, 1999, 91 pages.
"Part 11: Wireless LAN Medium Access Control (MAC) and Physical Layer (PHY) specifications", Information technology—Telecommunications and information exchange between systems—Local and metropolitan area networks—Specific requirements—, IEEE, Apr. 2003, pp. 1-69.
"PCT Search Report and Written Opinion", Application No. PCT/US2013/025144, Jun. 5, 2013, 10 pages.
"PCT Search Report and Written Opinion", Application No. PCT/US2011/054358, Dec. 16, 2011, 13 pages.
"PCT Search Report and Written Opinion", Application No. PCT/IB2013/000390, Aug. 21, 2013, 19 Pages.
"Restriction Requirement", U.S. Appl. No. 12/167,841, May 12, 2011, 6 pages.
"Supplemental Notice of Allowance", U.S. Appl. No. 12/186,429, Jul. 10, 2013, 2 pages.
"Supplemental Notice of Allowance", U.S. Appl. No. 12/716,569, Jul. 23, 2012, 2 pages.
Mujtaba "TGn Sync Proposal Technical Specification", IEEE 802.11-04/0889r6, This document presents the technical specification for the MAC and the PHY layer of the TGn Sync proposal to IEEE 802.11 TGn, May 18, 2005, pp. 1-131.
Mujtaba "TGn Sync Proposal Technical Specification", IEEE 802.11-04 / Wireless LANs, May 2005, pp. 1-131.
"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; Amendment 1: Radio Resource Measurement of Wireless LANs; IEEE Std 802.11k—2008, Jun. 12, 2008, 244 pages.
"IEEE Standard for Information Technology—Telecommunications and Information Exchange between Systems—Local and Metropolitan Area Networks—Specific Requirements", Part 11: Wireless LAN Medium Access Control (MAC) and Physical Layer (PHY) Specifications; IEEE Std. 802.11-2012, Mar. 29, 2012, 2793 pages.
"Introduction to 802.11n Outdoor Wireless Networks", InscapeData White Paper, Mar. 29, 2011, 9 pages.
"IEEE Standard for Information Technology—Telecommunications and Information Exchange between Systems—Local and Metropolitan Area Networks—Specific Requirements", IEEE Std. 802.11-2007, Jun. 12, 2007, 1232 pages.
"Wi-Fi Peer-to-Peer (P2P) Technical Specification", Wi-Fi Alliance Technical Committee P2P Task Group; Draft Version 1.14, Jun. 25, 2010, 154 pages.
"Non-Final Office Action", U.S. Appl. No. 13/722,354, Jan. 17, 2014, 17 pages.
"Notice of Allowance", U.S. Appl. No. 13/099,169, Feb. 12, 2014, 11 pages.
"Notice of Allowance", U.S. Appl. No. 13/249,740, Mar. 11, 2014, 6 pages.
"Notice of Allowance", U.S. Appl. No. 13/673,363, Mar. 24, 2014, 4 pages.

\* cited by examiner

METHOD AND APPARATUS FOR OFF-CHANNEL DEVICE INVITATION

RELATED APPLICATIONS

This present disclosure claims priority to U.S. Provisional Patent Application Ser. No. 61/490,452 filed May 26, 2011, the disclosure of which is incorporated by reference herein in its entirety.

BACKGROUND

The background description provided herein is for the purpose of generally presenting the context of the disclosure. Unless otherwise indicated herein, the approaches described in this section are not prior art to the claims in this disclosure and are not admitted to be prior art by inclusion in this section.

Computing devices often communicate with peripheral devices or other computing devices via a wireless medium to exchange data or obtain services. To do so, computing devices often join or form a wireless network on a particular channel of the wireless medium in order to facilitate access of data or services of other devices. A computing device managing a wireless network typically invites these other devices to join a new or existing wireless network. Inviting another device to join a network, however, can be time intensive because inviting another device involves scanning different channels of the wireless medium (i.e., going off-channel) and transmitting invitation frames to the other device.

A computing device managing a wireless network that includes different generations of wireless devices (e.g., legacy devices), however, may not be able to go off-channel due to communication timing constraints. Earlier generations of wireless devices may support limited types or revisions of communication protocols, some of which require almost constant in-channel communication to be maintained by a device managing the wireless network. This in-channel communication may not permit a device managing a wireless network to go off-channel for an amount of time sufficient to communicate with other devices. As such, a computing device managing a wireless network that includes a legacy device may be prevented from inviting other devices to join the wireless network.

SUMMARY

This summary is provided to introduce subject matter that is further described below in the Detailed Description and Drawings. Accordingly, this Summary should not be considered to describe essential features nor used to limit the scope of the claimed subject matter.

A method is described for transmitting a first frame on a first channel of a wireless medium that is effective to prevent a member device of a peer-to-peer group from attempting to access the wireless medium for a duration of time, transmitting a second frame on a second channel of the wireless medium that invites a wireless device operating off the first channel to join the peer-to-peer group, and returning to the first channel after transmitting the second frame to enable a next attempt of the member device to successfully access the wireless medium subsequent an expiration of the duration of time.

Another method is described for transmitting a first frame on a first channel of a wireless medium that is effective to prevent a legacy device of a peer-to-peer group from attempting to access the wireless medium for a duration of time, configuring a wireless interface to communicate on a second channel of the wireless medium, transmitting a second frame on the second channel of the wireless medium that invites a wireless device operating off-channel to join the peer-to-peer group, and configuring the wireless interface to communicate on the first channel of the wireless medium before or about when the duration of time expires effective to permit the legacy device to successfully access the wireless medium subsequent the expiration of the duration of time.

A System-on-Chip (SoC) is described that is configured to transmit a first frame on a first channel of a wireless medium that is effective to prevent a member device of a peer-to-peer group from attempting to access the wireless medium for a duration of time, transmit a second frame on a second channel of the wireless medium that invites a wireless device operating off the first channel to join the peer-to-peer group, and return to the first channel after transmitting the second frame to enable a next attempt of the legacy device to successfully access the wireless medium subsequent an expiration of the duration of time.

BRIEF DESCRIPTION OF THE DRAWINGS

The details of one or more implementations are set forth in the accompanying figures and the detailed description below. In the figures, the left-most digit of a reference number identifies the figure in which the reference number first appears. The use of the same reference numbers in different instances in the description and the figures indicate like elements.

DETAILED DESCRIPTION

Conventional techniques for inviting an off-channel device to join a peer-to-peer group can be limited or prevented when the peer-to-peer group includes a legacy device. This disclosure describes apparatuses and techniques for off-channel device invitation that permit a device managing a peer-to-peer group that includes a legacy device to go off-channel in order to invite other devices to join the peer-to-peer group. By so doing, the other devices operating off-channel can be invited to join the peer-to-peer group without scanning and/or listening to different channels of a wireless medium for these other devices, thereby minimizing an amount of time that the device managing the peer-to-peer group spends off-channel.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
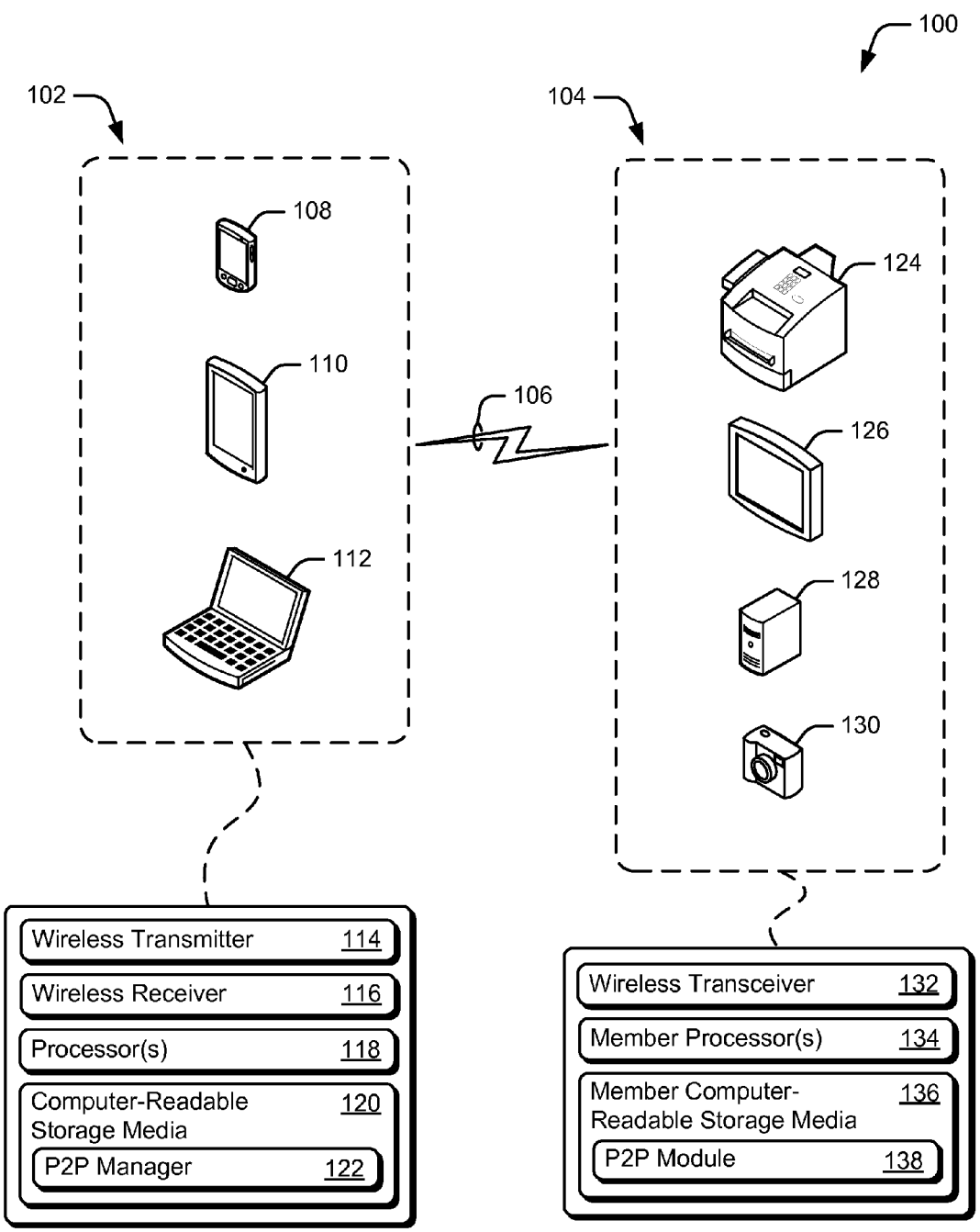
FIG. 1 illustrates an operating environment having wireless devices in accordance with one or more aspects.

FIG. 1 illustrates an example operating environment 100 having network manager devices 102 (manager devices 102) and network member devices 104 (member devices 104), each of which are capable of communicating data, packets, and/or frames over a wireless connection 106, such as a wireless-local-area network (WLAN). Manager devices 102 include smart-phone 108, tablet computer 110, and laptop computer 112. Although not shown, other configurations of manager devices 102 are also contemplated such as a desktop computer, server, mobile-internet device (MID), mobile gaming console, mobile hotspot, access point, and so on.

Each manager device 102 includes a wireless transmitter 114 and a wireless receiver 116 for providing a wireless interface to handle various communication protocols, such as for example IEEE 802.11-2007, IEEE 802.11k, IEEE 802.11n, and the like. Transmitter 114 and receiver 116 may be separate (shown) or combined (not shown) and may be hardware combined with or separate from firmware or software. Manager devices 102 also include processor(s) 118, computer-readable storage media 120 (CRM 120), and peer-to-peer manager 122 (P2P manager 122), which, in one implementation, is embodied on CRM 120. CRM 120 may include any suitable memory or storage device such as random-access memory (RAM), static RAM (SRAM), non-volatile RAM (NVRAM), read-only memory (ROM), or Flash memory useful to store data of applications and/or an operating system of the manager device 102. How P2P manager 122 is implemented and used varies and is described below.

Manager devices 102 may be configured as client devices in a wireless network having an infrastructure-based topology, such as connecting to an access point (AP) to obtain internet connectivity. Alternately or additionally, manager devices 102 may be configured to implement AP-like functionality when managing a peer-to-peer group of other devices as described below. In some cases, a manager device 102 may concurrently associate with an AP and a peer-to-peer group extending services or functionalities of either network to entities of both networks. In other cases, a manager device 102 may be configured as one of member devices 104 in a peer-to-peer group or network having another manager device 102.

Member devices 104 include multi-function printer 124, internet-protocol (IP) enabled television 126 (IP TV 126), network-attached storage (NAS) 128, and wirelessly-enabled camera 130 (camera 130). Other member devices contemplated include various computing devices and/or accessory devices, such as smart-phones, video cameras, digital picture frames, scanners, displays, speakers, human-input devices, and so on. Each member device 104 may provide services (e.g., capabilities or functions) or data that are accessible to a communicatively coupled manager device 102 or other member device 104. For example, tablet computer 110 is able to access print functions of multi-function printer 124 when connected wirelessly. Any of these devices may act as an access point, a peer-to-peer group member, or a client station, and may be dynamically configured to do so.

Each member device 104 includes wireless transceiver 132, which provides a wireless interface to handle various communication protocols, such as those mentioned above and elsewhere herein. Although shown as a single transceiver, wireless transceiver 132 may be implemented as a separate transmitter and receiver, and may be hardware combined with or separate from firmware or software. Member devices 104 also include member processor(s) 134, member computer-readable storage media 136 (member CRM 136), and peer-to-peer module 138 (P2P module 138), which, in one implementation, is embodied on member CRM 136. Member CRM 136 may include any suitable memory or storage device such as static RAM (SRAM), ROM, or Flash memory useful to store data of applications and/or an operating system of the member device 104.

P2P module 138 enables member device 104 to understand and implement peer-to-peer networking communications and functionalities, such as those defined by the Wireless Fidelity Alliance Peer-to-Peer Specification. For example, P2P module 138 may enable a member device 104 to transmit various frames, such as probe request frames, probe response frames, invitation request frames, or invitation response frames, which enable a member device 104 to join a peer-to-peer group on a same or different channel of a wireless medium.

Figure 2:
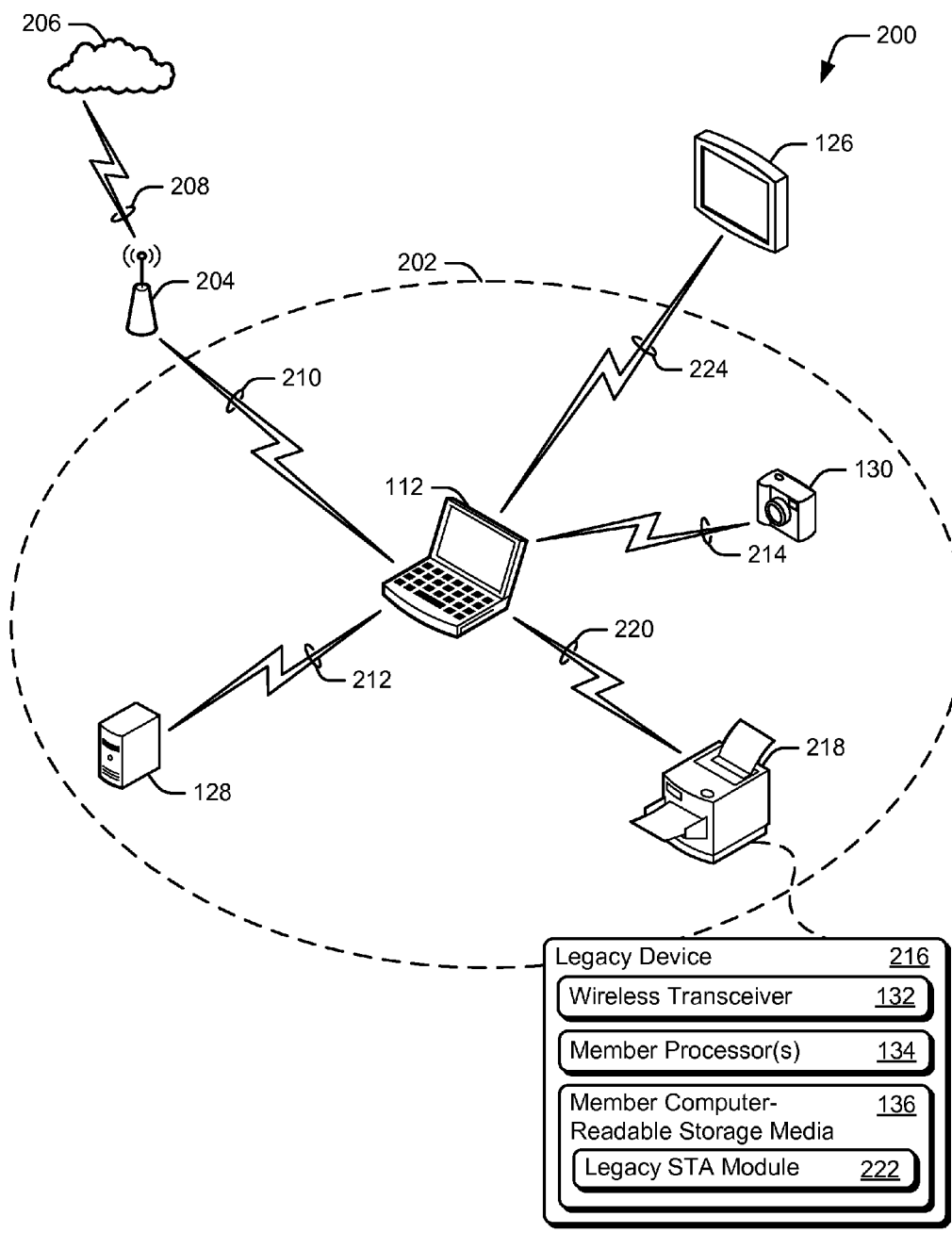
FIG. 2 illustrates an example of devices of FIG. 1 communicating in accordance with one or more aspects.

FIG. 2 illustrates an example of device environment 200 that includes a peer-to-peer group 202 (P2P group 202) managed by laptop computer 112. In this particular example, laptop computer 112 manages (e.g., owns) P2P group 202 by managing how and when devices of P2P group 202 communicate with each other. Additionally, access point 204, while operating in an infrastructure mode, provides laptop computer 112 with connectivity to Internet 206 or other networks via backhaul link 208, which may be either wired or wireless (e.g., a wireless-wide-area network). While associated with access point 204 via wireless connection 210, laptop computer 112 may extend access and/or connectivity with Internet 206 to devices of a peer-to-peer group being managed by laptop computer 112, such as member devices of P2P group 202.

When within range of laptop computer 112, member devices 104 may join P2P group 202, such as NAS 128 via wireless connection 212 and camera 130 via wireless connection 214. P2P group 202 also includes legacy member device 216 (legacy device 216), here illustrated as printer 218 associated with laptop computer 112 via wireless connection 220. Legacy device 216 may be configured similarly as member devices 104, having a wireless transceiver 132, member processor 134, and member CRM 136. Legacy device 216 differs from other member devices 104, however, in that legacy device 216 includes legacy station module 222 (legacy STA module 222). Legacy STA module 222 enables legacy device 216 to be configured as a client station of a wireless network. Legacy STA module 222, however, may not support peer-to-peer networking communication protocols or capabilities that are enabled by P2P module 138 of member devices 104. For instance, legacy device 216 may not understand P2P networking frames, such as notice-of-absence (NoA) frames, invitation frames, and the like. For example, legacy device 216 may not be capable of understanding P2P Information Elements (IEs) within frames such as probe requests, probe responses, beacons, and so on. Although legacy device 216 may not understand P2P communications, a manager device 102 (e.g., laptop computer 112) may implement AP-like functionality enabling legacy device 216 to join P2P group 202. Implementing this AP-like functionality for legacy devices may increase an amount of time a manager device 102 remains in-channel to communicate with the legacy devices.

As described above, various member devices 104 may join a peer-to-peer group or peer-to-peer network. Joining a peer-to-peer group may be initiated by either manager device 102 or member device 104, as either type of device may transmit probe requests on various channels of a wireless medium in an attempt to find other devices. In some cases, however, a peer-to-peer group may include a legacy device 216 that does not understand peer-to-peer networking communication protocols. Thus, manager device 102 (e.g., group owner) of the peer-to-peer group may be prevented from going off-channel, as a requirement to maintain in-channel communication with legacy device 216 may not yield sufficient time to do so. In such a case, techniques of off-channel device invitation permit manager device 102 to invite an off-channel device to join a peer-to-peer network by minimizing an amount of time spent off-channel. For example, laptop computer 112 can invite IP TV 126 to join P2P group 202 via wireless connection 224. These are but a few example aspects of implementing techniques of off-channel device association which are described below.

Techniques of Off-Channel Device Invitation

The following discussion describes techniques of off-channel device invitation. These techniques can be implemented using the previously described environments or entities, such as P2P manager 122 of FIG. 1 embodied on a manager device 102. These techniques include methods illustrated in FIGS. 3 and 4, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environment 100 of FIG. 1 and entities of FIG. 2 by way of example. Such reference is not to be taken as limited to operating environment 100 but rather as illustrative of one of a variety of examples.

Figure 3:
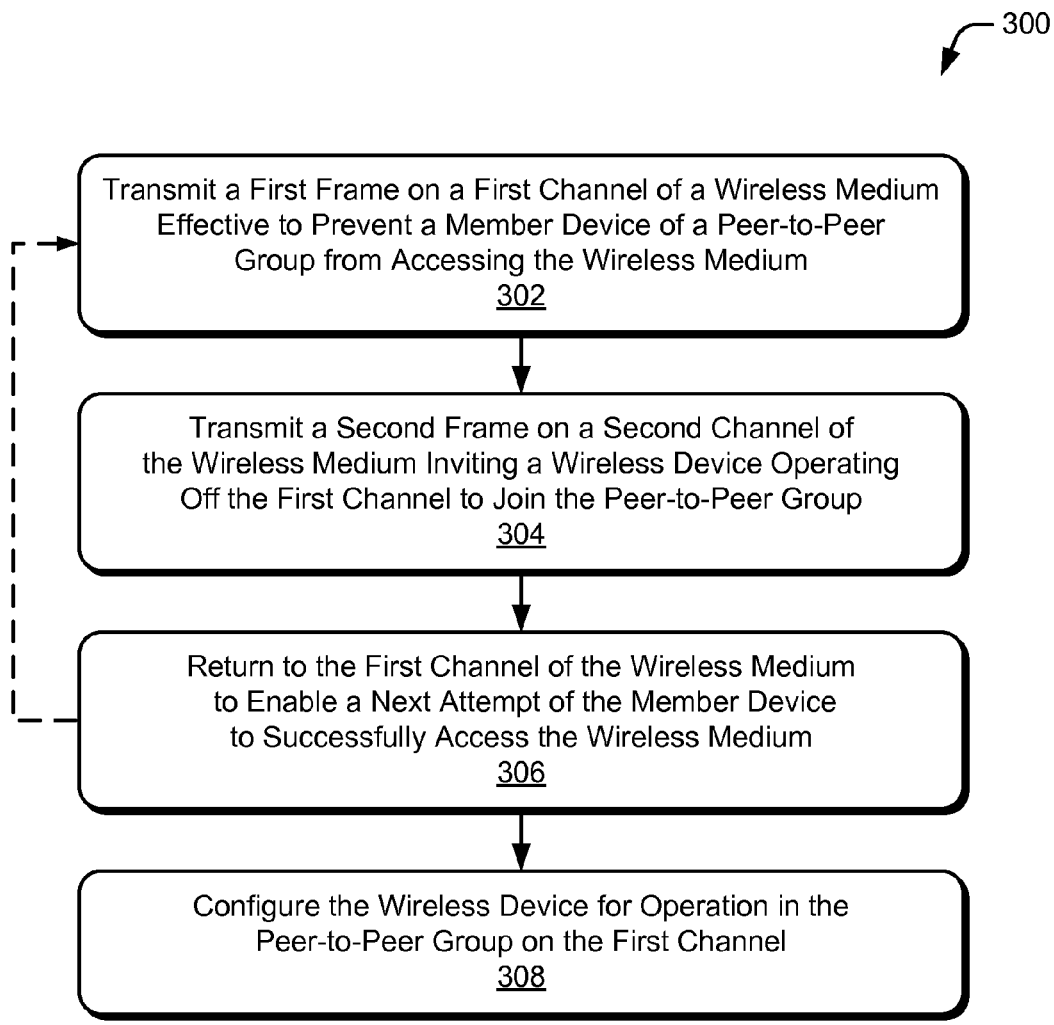
FIG. 3 illustrates a method of inviting an off-channel wireless device to join a peer-to-peer group.

FIG. 3 depicts a method 300 for inviting an off-channel wireless device to join a peer-to-peer group, including operations performed by P2P manager 122 of FIG. 1.

At 302, a first frame effective to prevent a member device of a peer-to-peer group from accessing a wireless medium is transmitted on a first channel of a wireless medium. In some cases, the member device may be a legacy device that is not capable of understanding peer-to-peer networking communications. The first frame may be a clear-to-send-to-self (CTS-to-self) frame or a null frame. In such cases, these frames may indicate that the wireless medium is unavailable for a particular amount of time. For example, a CTS-to-self frame or a null frame may indicate that the wireless medium is unavailable for up to 32 milliseconds. As the member device may not understand peer-to-peer networking communications, a peer-to-peer management frame, such as a notice-of-allowance (NoA) frame, may not be sufficient to prevent a device from attempting to access the wireless medium.

As an example, consider laptop computer 112 in the context of FIG. 2, which shows laptop computer 112 managing P2P group 202. Assume here that P2P group 202 is operating on channel 6 of the 2.4 GHz band as defined by IEEE 802.11. Also assume here that a user decides to display content of laptop computer 112 via IP TV 126, which is not currently associated with P2P group 202. Here, P2P manager 122 transmits a null frame to member devices of P2P group 202 indicating that communicative access to P2P group 202 will be unavailable for 32 milliseconds. This null frame is effective to prevent the member devices of P2P group 202 from attempting to communicate within, or access resources of, P2P group 202 for at least 32 milliseconds.

At 304, a second frame inviting a wireless device operating off the first channel (e.g., off-channel) to join the peer-to-peer network is transmitted on a second channel of the wireless medium. This second frame may be transmitted without scanning the second channel for wireless devices. For instance, the second frame may be transmitted without listening to the second channel or broadcasting probe requests on the second channel. In some cases, the second frame may be a peer-to-peer management frame, such as an invitation request frame. In such cases, the wireless device may respond to the invitation request frame with an acknowledgment or an invitation response frame. The second channel may reside in a different frequency band of the wireless medium than the first channel. The second channel of the wireless medium may be randomly selected, iteratively selected, or directly selected if known, such as received by user input, referenced from a look-up table, or remembered from having previously been associated with a particular device.

In the context of the present example, assume that IP TV 126 is currently operating on channel 164 of the 5 GHz band as defined by IEEE 802.11. Also assume here that laptop computer 112 has previously associated with IP TV 126 and therefore knows that IP TV 126 can be found on channel 164. Here, laptop computer 112 transmits a peer-to-peer invitation request frame on channel 164 without scanning channel 164 for wireless devices. Responding to the invitation frame, IP TV 126 indicates to laptop computer 112 that it will join the peer-to-peer group on channel 6 of the 2.4 GHz band.

At 306, the first channel of the wireless medium is returned to enabling a next attempt of the member device to successfully access the wireless medium. The member device may attempt to access the wireless medium after a duration of time expires, such as the duration indicated by the first frame transmitted at 302. In some cases, the first channel of the wireless medium is returned to in less than or about 32 milliseconds, which may be about a maximum amount of time that a CTS-to-self frame or null frame may indicate.

Continuing the ongoing example, laptop computer 112 returns to channel 6 of the 2.4 GHz band from channel 164 of the 5 GHz band after transmitting the invitation request frame. Here, laptop computer 112 returns to channel 6 in less than 32 milliseconds since transmitting the null frame. Thus, laptop computer 112 is able to manage P2P group 202 when devices of the network begin requesting communicative access after the duration of time (e.g., 32 milliseconds) indicated by the null frame expires.

As another example, assume that laptop computer 112 had transmitted a frame indicating that access to wireless medium associated with P2P group 202 will be unavailable for 100 milliseconds. Laptop computer 112 would then have 100 milliseconds to transmit frames inviting off-channel devices to join P2P group 202 before returning to P2P group 202. In such a case, laptop computer 112 may transmit frames inviting off-channel devices on one or more different channels during the 100 milliseconds of off-channel time.

From operation 306, method 300 may return to operation 302 or proceed to operation 308. Returning to 302, another attempt can be made to invite an off-channel device to join the peer-to-peer group by repeating operations 302, 304, and 306. For instance, the operations may be repeated when another device is not on a particular channel of the wireless medium during an iteration of the method. Each iteration of method 300 may invite wireless devices from another different channel of a wireless medium until a desired device is added to the peer-to-peer group. For example, each iteration of method 300 may attempt to invite an off-channel device from a different channel or repeatedly from a same channel. In the case of repeated attempts on the same channel, after a particular number of attempts have been made (e.g., 5 to 10 attempts), method 300 may then proceed to another different channel.

At 308, the wireless device is configured for operation in the peer-to-peer group on the first channel of the wireless medium. Configuring the wireless device may include associating with and/or authenticating the wireless device to enable the device to communicate within the peer-to-peer network. Once configured for operation in the peer-to-peer network, data or services of the wireless device may be accessed by a device managing the peer-to-peer network or other member devices of the peer-to-peer network.

Concluding the present example, laptop computer 112 associates with, and subsequently authenticates, IP TV 126 via wireless connection 224. Once authenticated, IP TV 126 may display content of other devices of P2P group 202, such as laptop computer 112 and camera 130. Additionally, IP TV 126 may stream, download, and/or display content from Internet 206, as laptop computer 112 provides internet connectivity to the devices of P2P group 202.

Figure 4:
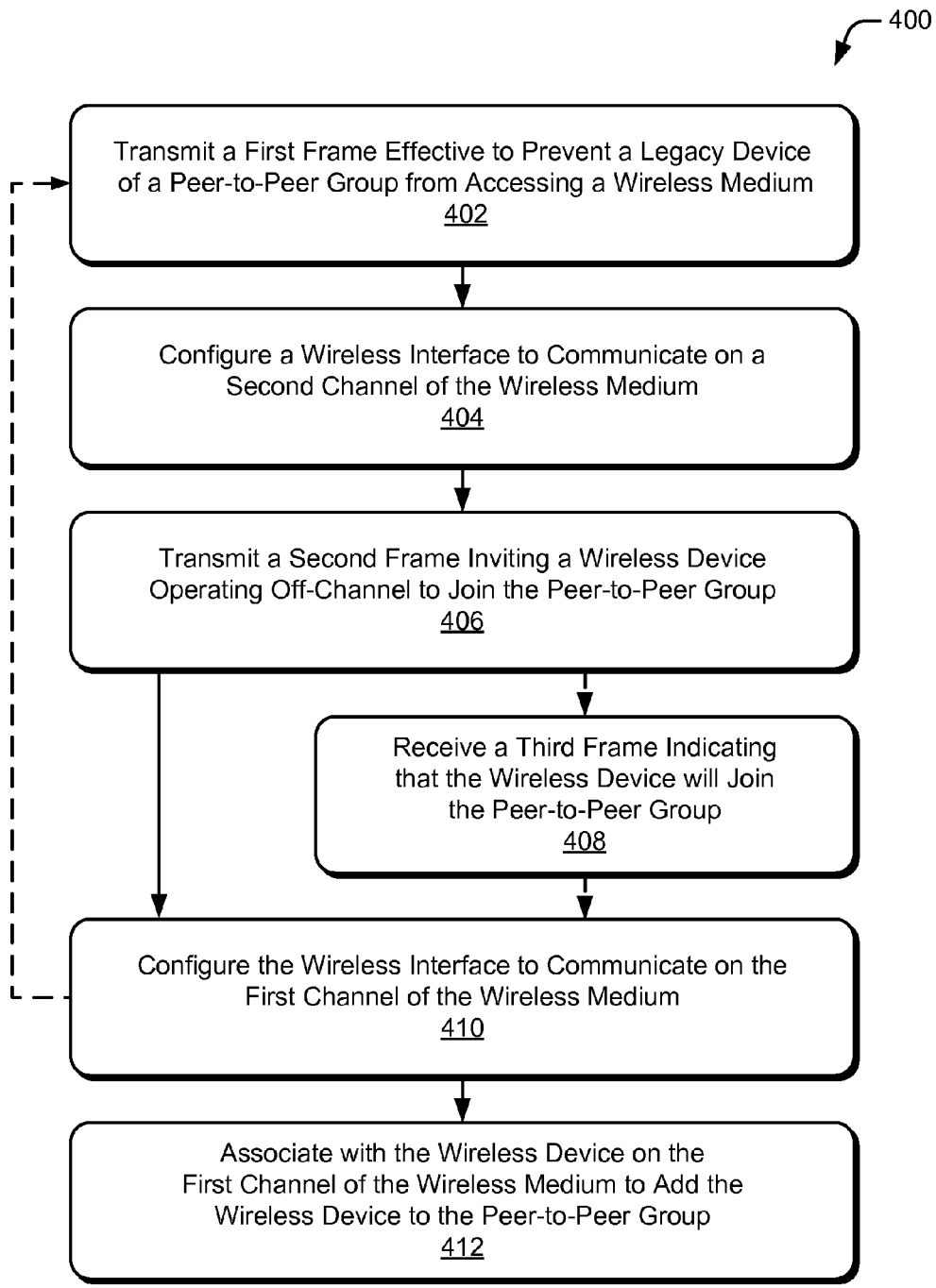
FIG. 4 illustrates a method of configuring a wireless interface for off-channel device invitation.

FIG. 4 depicts a method 400 configuring a wireless interface for off-channel device invitation, including operations performed by P2P manager 122 of FIG. 1.

At 402, a first frame is transmitted on a first channel of a wireless medium effective to prevent a legacy device of a peer-to-peer group from accessing the wireless medium for a duration of time. The first frame may be transmitted via a wireless interface configured to communicate on the first channel of the wireless medium. The legacy device, although part of the peer-to-peer group, may not understand peer-to-peer networking communications.

Figure 5:
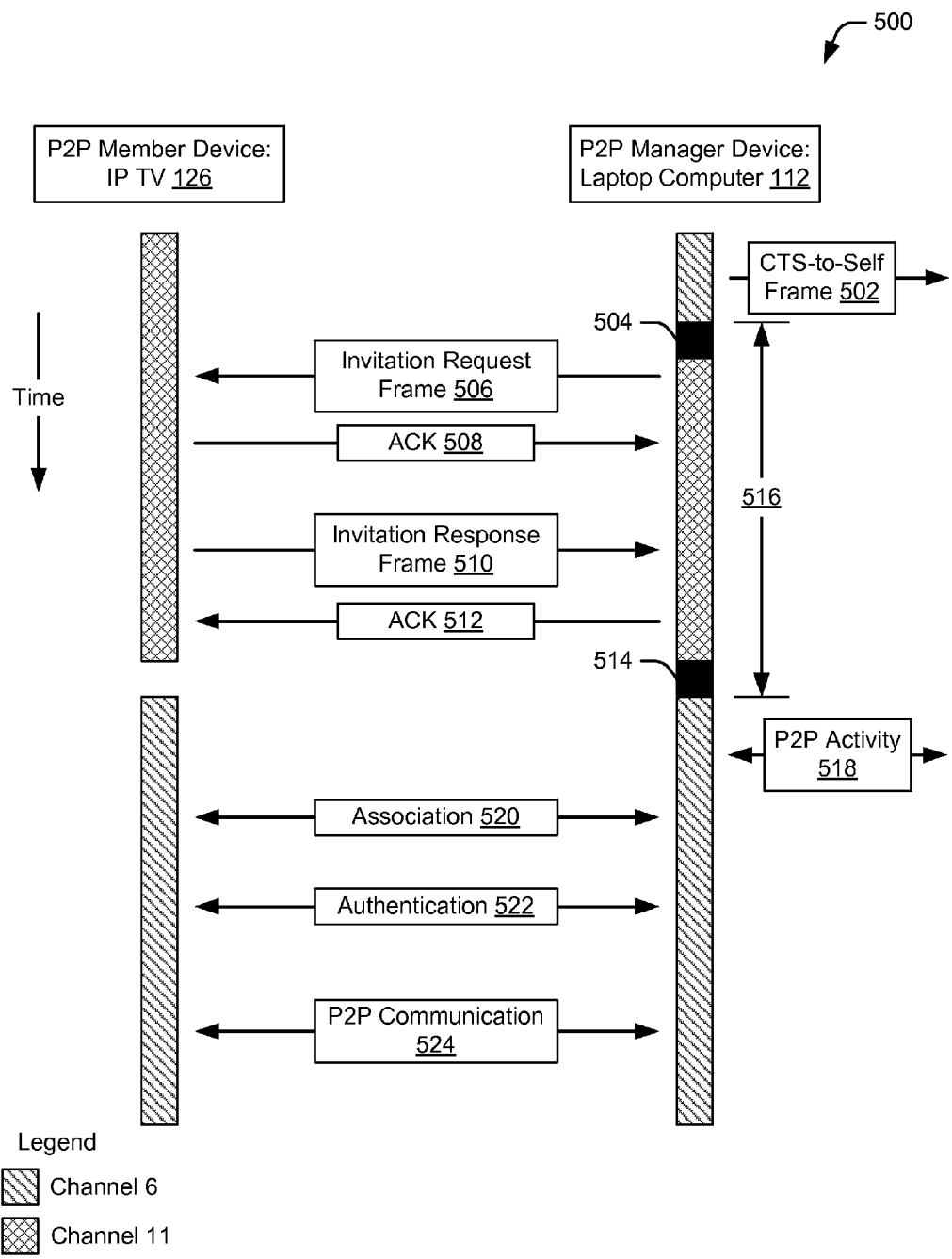
FIG. 5 illustrates an example flow diagram of communications in accordance with one or more aspects.

The peer-to-peer group may include peer-to-peer networking-enabled devices that understand peer-to-peer networking communications. In some cases, the first frame transmitted is a CTS-to-self frame or a null frame that can be understood by most or all member devices of the peer-to-peer group including legacy devices. In such cases, the CTS-to-self frame or the null frame may indicate that the wireless medium is unavailable for up to 32 milliseconds As an example, consider laptop computer 112 again in the context shown in FIG. 2, which shows P2P group 202 including NAS 128, camera 130, and printer 218, which is a legacy device 216. Assume here that P2P group 202 is operating on channel 6 of the 2.4 GHz band. As illustrated in FIG. 5, which illustrates an example communication flow associated with operations method 400, P2P manager 122 causes laptop computer 112 to transmit CTS-to-self frame 502 to members of P2P group 202 (not shown) on channel 6. Assume here that a duration of CTS-to-self frame 502 is set to 32 milliseconds.

At 404, a wireless interface is configured to communicate on a second channel of the wireless medium. Configuring the wireless interface to communicate on another channel may consume up to or about 2 to 2.5 milliseconds of time. In some cases the second channel may reside in a same frequency band of the wireless medium as the first channel. In other cases, the first and the second channels may reside in different frequency bands of the wireless medium. Continuing the ongoing example, P2P manager 122 reconfigures wireless transmitter 114 and wireless receiver 116 of laptop computer 112 to communicate on channel 11 as illustrated at 504.

At 406, a second frame inviting a wireless device operating off-channel to join the peer-to-peer group is transmitted on the second channel of the wireless medium. This second frame may be transmitted without scanning the second channel for wireless devices. In some cases, the second frame may be a peer-to-peer management frame, such as an invitation request frame. Transmitting the second frame may consume about 34 microseconds associated with a distributed coordination function interspace frame space (DIFS) interval. Additionally, the wireless device may respond to the invitation frame with an acknowledgment. Receiving this acknowledgement may consume about 16 microseconds of time associated with a short interspace frame space (SIFS) interval.

Continuing the ongoing example, P2P manager 112 causes laptop computer 112 to transmit invitation request frame 506 to IP TV 126 on channel 11 of the 2.4 GHz band. Here, laptop computer 112 transmits invitation request frame 506 without scanning channel 11 for other computing devices. Also assume here that IP TV 126 responds to invitation request frame 506 with acknowledgement 508 (ACK 508). Although not necessary, receiving ACK 508 indicates to laptop computer 112 that invitation request frame 506 was received by another device, in this case IP TV 126.

Optionally at 408, a third frame indicating that the wireless device will join the peer-to-peer group is received on the second channel of the wireless medium. The third frame may be an invitation response frame or another peer-to-peer networking frame indicating such. In some cases, the third frame may include other information such as an indication of a status of the wireless device, services provided by the device, a channel the device intends to move to, and so on. Receiving this third frame may consume about 34 microseconds associated with a DIFS interval. Additionally, an acknowledgement may be transmitted to the wireless device in response to receiving the frame. Transmitting this acknowledgement may consume about 16 microseconds of time associated with a SIFS interval.

In the context of the present example, laptop computer 112 receives invitation response frame 510 from IP TV 126 on channel 11. Invitation response frame 510 indicates to laptop computer 112 that IP TV 126 will join P2P group 202 on channel 6. Although not necessary, laptop computer 112 acknowledges receiving invitation response frame 510 by transmitting ACK 512 back to IP TV 126.

At 410, the wireless interface is configured to communicate on the first channel of the wireless medium. Configuring the wireless interface to communicate on the first channel may enable a next attempt of the legacy device to access the wireless medium to be granted. As described above, configuring the wireless interface to communicate on another channel may consume up to or about 2 to 2.5 milliseconds of time. The wireless interface can be configured to communicate on the first channel before or about when a duration of time expires, during which the legacy device is prevented from accessing the wireless medium. In some cases, returning to the first channel may be responsive to receiving the third frame at operation 408. In such cases, returning to the first channel may occur immediately after receiving the third frame, or shortly thereafter. Returning to the first channel in such a manner may be effective to permit a device managing a peer-to-peer group to go off-channel for device invitation while the legacy device is prevented from accessing the wireless medium.

By way of example, after transmitting a CTS-to-self frame having a duration of 32 milliseconds, operations 404, 406, 408, and 410 may be completed before a next attempt of a legacy device to access the wireless medium. Configuring the wireless interface at operations 404 and 410 may consume about or up to 5 milliseconds (2×2.5 milliseconds). Transmitting an invitation request frame and receiving an acknowledgment at operation 406 may consume about or up to 50 microseconds (DIFS interval+SIFS interval). Receiving an invitation response frame and transmitting an acknowledgment at operation 408 may consume about or up to 50 microseconds (DIFS interval+SIFS interval). Thus, operations 404, 406, 408, and 410 may complete in about or less than 6 milliseconds (5 milliseconds+100 microseconds) yielding at least 24 milliseconds of time in which to complete an invitation exchange or handshake procedure.

Continuing the ongoing example, P2P manager 122 configures wireless transmitter 114 and wireless receiver 116 of laptop computer 112 to communicate on channel 6 as illustrated at 514. Here, laptop computer 112 has spent time 516 off-channel inviting IP TV 126 to join P2P group 202. Time 516 may be about or less than the amount of time that CTS-to-self frame 502 prevents other devices, including printer 218, of P2P group 202 from attempting to access the wireless medium. Assume here that time 516 is about 30 milliseconds during which laptop computer 112 goes off-channel to invite IP TV 126 to join P2P group 202. As the duration of CTS-to-self frame 502 is 32 milliseconds, laptop computer 112 returns to channel 6 with time sufficient to enable communication within P2P group 202 (P2P activity 518) before any devices of the group attempt to access the wireless medium.

From operation 410, method 400 may return to operation 402 or proceed to operation 412. Returning to 402, wireless devices operating on other channels of the wireless medium may be invited to join the peer-to-peer group by repeating operations 402, 404, 406, 408, and/or 410 as necessary. For instance, the operations may be repeated when a frame indicating that a wireless device will join the peer-to-peer group is not received at operation 408 of a previous iteration of the method. Each iteration of method 400 may invite wireless devices from different channels of a wireless medium until a desired device is found. For example, each iteration of method 400 may attempt to invite an off-channel device from a different channel or repeatedly from a same channel. In the case of repeated attempts on the same channel, after a particular number of attempts have been made (e.g., 5 to 10 attempts), method 400 may then proceed to another different channel.

At 412, an association with the wireless device is established to add the wireless device to the peer-to-peer group. In some cases, the wireless device may be authenticated using any suitable security or authentication protocol. Once added to the peer-to-peer group, data or services of the wireless device may be accessed by a device managing the peer-to-peer group or other member devices of the peer-to-peer group. Alternately or additionally, the wireless device may access data or services of the peer-to-peer group, such as internet connectivity, multimedia data, media streams, and the like.

Concluding the present example, assume that IP TV 126 has moved to channel 6 to join P2P group 202. Here, laptop computer 112 proceeds with association 520 and authentication 522 of IP TV 126 on channel 6. Once associated and authenticated, IP TV 126 can engage in peer-to-peer communication 524 (P2P communication 524). As such, laptop computer 112 can now access services and data of IP TV 126 for various purposes, such as to display content, play media, and the like.

System-On-Chip

Figure 6:
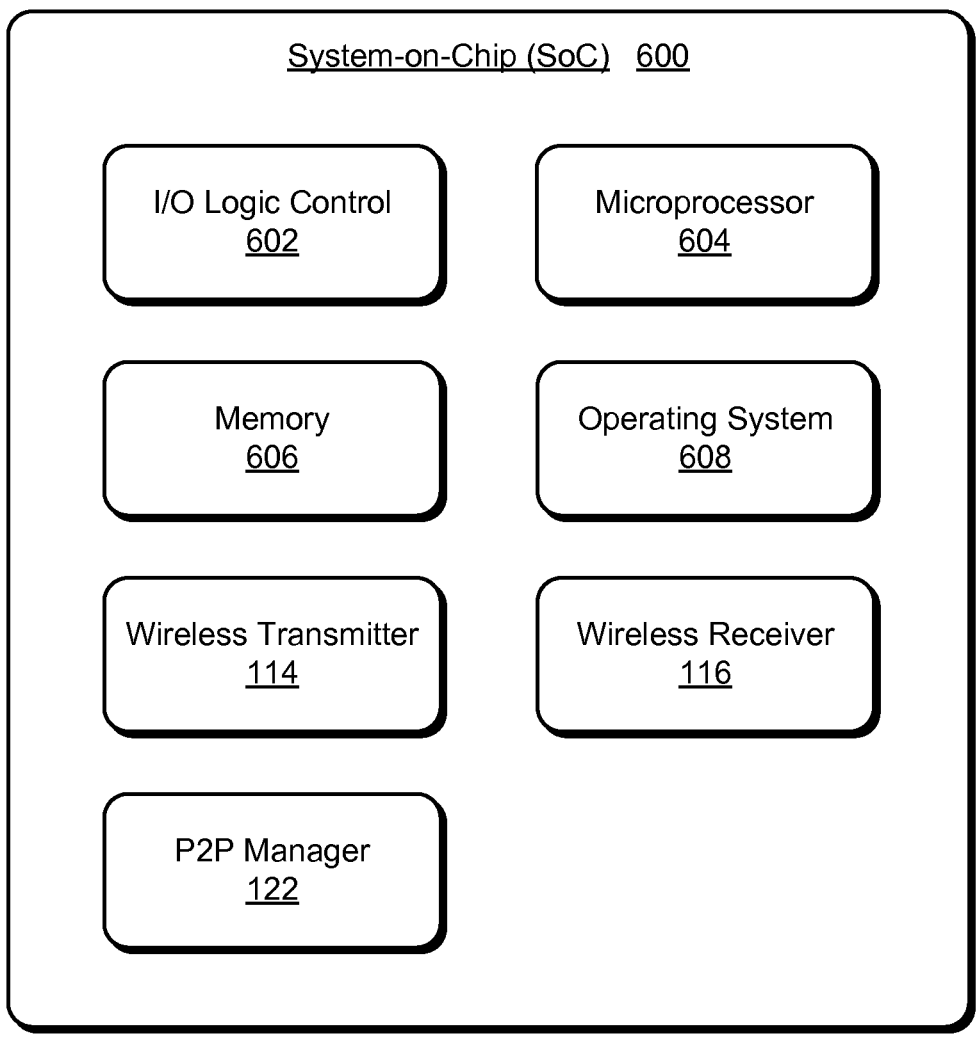
FIG. 6 illustrates a System-on-Chip (SoC) environment for implementing aspects of the techniques described herein.

FIG. 6 illustrates a System-on-Chip (SoC) 600, which can implement various embodiments described above. A SoC can be implemented in any suitable device, such as a video game console, IP enabled television, smart-phone, desktop computer, laptop computer, access point, wireless router, tablet computer, server, network-enabled printer, set-top box, printer, scanner, camera, picture frame, and/or any other type of device that may implement wireless connective technology.

SoC 600 can be integrated with electronic circuitry, a microprocessor, memory, input-output (I/O) logic control, communication interfaces and components, other hardware, firmware, and/or software needed to provide communicative coupling for a device, such as any of the above-listed devices. SoC 600 can also include an integrated data bus (not shown) that couples the various components of the SoC for data communication between the components. A wireless communication device that includes SoC 600 can also be implemented with many combinations of differing components. In some cases, these differing components may be configured to implement concepts described herein over a wireless connection or interface.

In this example, SoC 600 includes various components such as an input-output (I/O) logic control 602 (e.g., to include electronic circuitry) and a microprocessor 604 (e.g., any of a microcontroller or digital signal processor). SoC 600 also includes a memory 606, which can be any type of RAM, low-latency nonvolatile memory (e.g., Flash memory), ROM, and/or other suitable electronic data storage. SoC 600 can also include various firmware and/or software, such as an operating system 608, which can be computer-executable instructions maintained by memory 606 and executed by microprocessor 604. SoC 600 can also include other various communication interfaces and components, communication components, other hardware, firmware, and/or software.

SoC 600 includes wireless transmitter 114, wireless receiver 116, and P2P manager 122 (embodied as disparate or combined components as noted above). Examples of these various components, functions, and/or entities, and their corresponding functionality, are described with reference to the respective components of the environment 100 shown in FIG. 1 and FIG. 2.

P2P manager 122, either independently or in combination with other entities, can be implemented as computer-executable instructions maintained by memory 606 and executed by microprocessor 604 to implement various embodiments and/or features described herein. P2P manager 122 may also be provided integral with other entities of the SoC, such as integrated with one or both of I/O logic controller 602 or any packet-based interface within SoC 600. Alternatively or additionally, P2P manager 122 and the other components can be implemented as hardware, firmware, fixed logic circuitry, or any combination thereof that is implemented in connection with the I/O logic control 602 and/or other signal processing and control circuits of SoC 600.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
   transmitting, via a transmitter and on a first channel of a wireless medium, a first frame effective to prevent a member device of a peer-to-peer group operating on the first channel from attempting to access the wireless medium for a duration of time;
   transmitting, via the transmitter and on a second channel of the wireless medium and without scanning the second channel for wireless devices, a second frame inviting a wireless device operating off the first channel to join the peer-to-peer group on the first channel;
   receiving, via a receiver and on the second channel of the wireless medium, a third frame from the wireless device indicating that the wireless device will join the peer-to-peer group on the first channel of the wireless medium; and
   returning, responsive to receiving the third frame via the receiver and prior to the duration of time expiring, to the first channel of the wireless medium effective to enable a next attempt of the member device to successfully access the wireless medium subsequent the expiration of the duration of time.

2. The method of claim 1, wherein the member device of the peer-to-peer group is a legacy device that is not capable of understanding peer-to-peer networking communications.

3. The method of claim 1, wherein the first frame is a clear-to-transmit-to-self (CTS-to-self) frame or a null frame.

4. The method of claim 1, wherein the first channel is in a first frequency band of the wireless medium, and the second channel is in a second frequency band of the wireless medium.

5. The method of claim 1, further comprising configuring, via the first channel of the wireless medium and after returning to the first channel of the wireless medium, the wireless device for operation in the peer-to-peer group.

6. The method of claim 1, wherein the method is performed by another wireless device managing the peer-to-peer group operating on the first channel.

7. The method of claim 1, wherein the duration of time is less than 32 milliseconds.

8. The method of claim 1, wherein transmitting is performed via a wireless interface that includes the transmitter and the receiver, and further comprising:
   configuring, after transmitting the first frame, the wireless interface to communicate on the second channel of the wireless medium; and
   configuring, after transmitting the second frame, the wireless interface to communicate on the first channel of the wireless medium prior to the duration of time expiring.

9. The method of claim 8, wherein the wireless interface is a wireless local-area-network (WLAN) interface compliant with an IEEE 802.11 standard.

10. The method of claim 8, further comprising associating, via the wireless interface configured to communicate on the first channel, with the wireless device effective to add the wireless device to the peer-to-peer group.

11. The method of claim 8, wherein the wireless interface is embodied in a smart-phone, laptop computer, tablet computer, desktop computer, wireless router, or gaming console.

12. The method of claim 1, wherein the peer-to-peer group includes other wireless devices that understand peer-to-peer networking communications.

13. The method of claim 1, wherein the first channel and the second channel of the wireless medium are in a same frequency band of the wireless medium.

14. A system-on-chip (SoC) comprising:
   a transmitter configured to transmit via a wireless medium;
   a receiver configured to receive via the wireless medium; and
   a peer-to-peer manager configured to:
      transmit, via the transmitter, a first frame effective to prevent a member device of a peer-to-peer group operating on a first channel of the wireless medium from attempting to access the wireless medium for a duration of time;
      transmit, via the transmitter and without scanning a second channel of the wireless medium for wireless devices, a second frame inviting a wireless device operating off the first channel to join the peer-to-peer group on the first channel;
      receive, via the receiver and on the second channel, a third frame from the wireless device indicating that the wireless device will join the peer-to-peer group on the first channel of the wireless medium; and
      enable, responsive to receiving the third frame and prior to the duration of time expiring, the transmitter and the receiver to communicate on the first channel of the wireless medium effective to grant a next attempt of the member device to successfully access the wireless medium subsequent the expiration of the duration of time.

15. The SoC of claim 14, wherein the member device of the peer-to-peer group is not capable of understanding peer-to-peer networking communications.

16. The SoC of claim 14, wherein the peer-to-peer manager is further configured to associate, via the first channel of the wireless medium, with the wireless device effective to enable the wireless device to operate within the peer-to-peer group.

17. The SoC of claim 14, wherein the second frame inviting the wireless device to join the peer-to-peer group is a peer-to-peer invitation request frame and the third frame indicating that the wireless device will join the peer-to-peer group is a peer-to-peer invitation response frame.

18. The SoC of claim 14, wherein the peer-to-peer group operates in accordance with a Wireless Fidelity Alliance Peer-to-Peer Specification.

19. The SoC of claim 14, wherein the duration of time is less than 32 milliseconds.

20. The SoC of claim 14, wherein the first channel and the second channel of the wireless medium are in a same frequency band of the wireless medium.

* * * * *